United States Patent
Becker et al.

[11] Patent Number: 5,848,754
[45] Date of Patent: Dec. 15, 1998

[54] METHOD AND APPARATUS FOR THE RECOVERY OF PACKAGING AND ITS CONTENTS

[75] Inventors: Günter Becker, Bramstedt; Joachim Bredehöft, Rhade, both of Germany

[73] Assignee: Nordischer Maschinenbau Rud. Baader GmbH & Co. KG, Lubeck, Germany

[21] Appl. No.: 841,571

[22] Filed: Apr. 30, 1997

Related U.S. Application Data

[63] Continuation-in-part of Ser. No. 540,825, Oct. 11, 1995, abandoned.

[30] Foreign Application Priority Data

Oct. 12, 1994 [EP] European Pat. Off. .............. 94116115

[51] Int. Cl.⁶ .................................................. B02C 19/12
[52] U.S. Cl. ........................... 241/24.16; 241/29; 241/79; 241/236; 241/243
[58] Field of Search .................................. 426/478, 518; 209/3, 3.1, 7, 9; 241/DIG. 38, 74, 152.2, 86.1, 56, 88.1, 95, 89.3, 78, 24.16, 79, 24.26, 79.1, 81, 29, 236, 243

[56] References Cited

U.S. PATENT DOCUMENTS

| | | | |
|---|---|---|---|
| 700,368 | 5/1902 | Pierpont . | |
| 790,368 | 5/1905 | Johnson . | |
| 3,596,842 | 8/1971 | Barber | 241/236 X |
| 3,981,454 | 9/1976 | Williams | 241/78 X |
| 4,014,462 | 3/1977 | Robertson . | |
| 5,100,064 | 3/1992 | Holzknecht | 241/24.16 X |
| 5,230,917 | 7/1993 | Peters | 241/240.16 X |
| 5,352,469 | 10/1994 | Peters | 241/24.16 X |
| 5,522,554 | 6/1996 | Blank et al. | 241/78 X |

FOREIGN PATENT DOCUMENTS

| | | |
|---|---|---|
| 0394625 | 10/1990 | European Pat. Off. . |
| 0421078 | 4/1991 | European Pat. Off. . |
| 0542458 | 5/1993 | European Pat. Off. . |
| 0710512 | 5/1996 | European Pat. Off. . |
| 2622172 | 4/1989 | France . |
| 2032774 | 1/1972 | Germany . |
| 3111625 | 9/1982 | Germany . |
| 26-7881 | 10/1912 | Japan . |

*Primary Examiner*—Mark Rosenbaum
*Attorney, Agent, or Firm*—Fay, Sharpe, Beall, Fagan, Minnich & McKee

[57] ABSTRACT

A method and apparatus serve to packaging material and its contents, specifically from packaging elements filled with soft material such as food packaging. The method allows a clean separation of the packaging and content materials so that, according to the application, each of these materials can be reused individually with substantially no further preparation. The apparatus comprises a combination of a coarse cutter in the form of a shredder and a soft separator working on the drum and pressing belt principle with a further fine cutter or fragmenter in the form of a blower mill arranged downstream of these. By coarsely cutting the packaging materials prior to compression, cavities in which amounts of contents material may remain trapped cannot be formed, the soft separator can thus operate more effectively to cleanly separate the two materials.

15 Claims, 5 Drawing Sheets

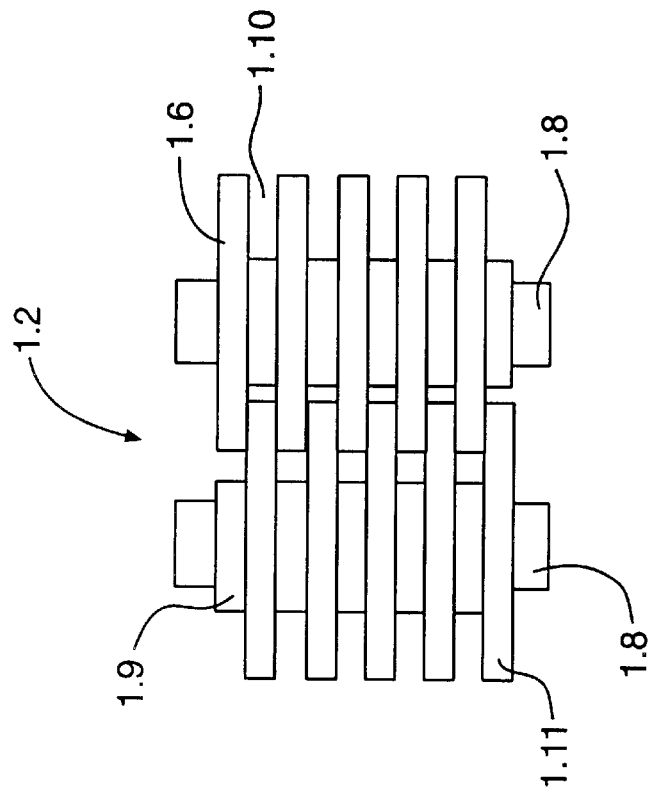
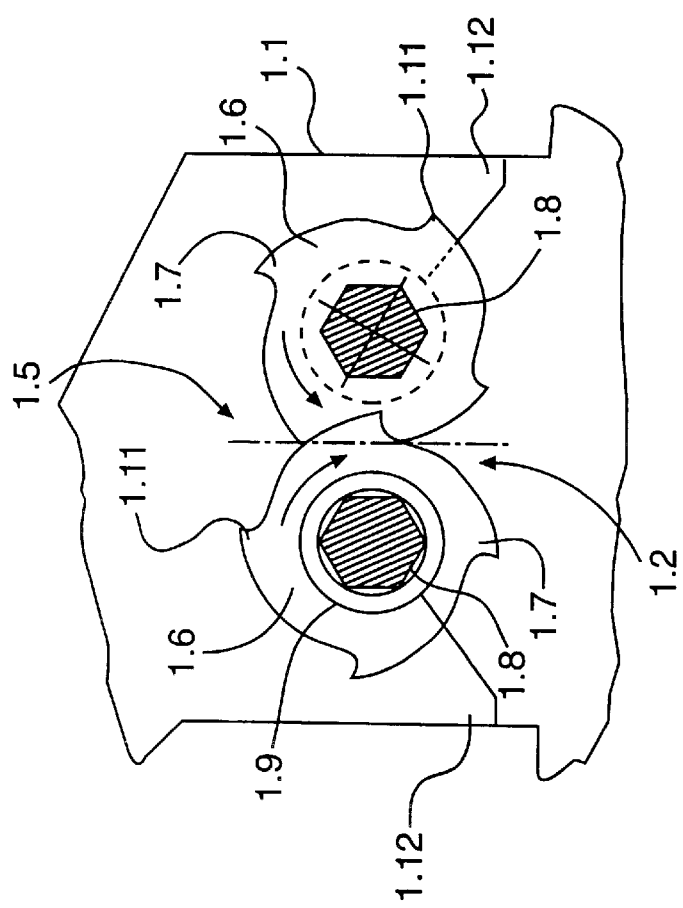
FIG. 4
FIG. 5

METHOD AND APPARATUS FOR THE RECOVERY OF PACKAGING AND ITS CONTENTS

This application is a continuation-in-part of U.S. patent application Ser. No. 08/540,825 filed on Oct. 11, 1995, abandoned.

BACKGROUND OF THE INVENTION

1. Field of the Invention

The invention concerns a method and apparatus for recovering packaging material and its contents, in particular for packaging elements containing or covered by soft material, such as food packaging of the form of packaging for butter, cheese, yoghurt, sausage, ready-to-serve meals or the like, in order to reuse the packaging or its contents.

2. Prior Art

The increasingly restrictive waste regulations issued with the intention of reducing damage to the environment make the present day disposal of waste more and more difficult. The majority of disposal sites now refuse to accept unsorted waste, which causes great difficulties for those enterprises for whom the manual or automatic sorting of waste is unprofitable due to the relatively small amount of waste produced. This situation primarily affects supermarkets or small food producers and the like. Consequently, an increasing number of collection and sorting enterprises have established themselves with the self-prescribed aim of reducing the accumulating waste volume in an ecomomically viable manner. This includes the object of making the reutilisable parts available for further processing in the highest quality possible. This primarily requires that the different kinds of waste material are cleanly separated, which in the case of packaging having contents which have passed their sell-by date is clearly not readily achievable. This is also true for empty packaging, which contain remains of, or is merely coated by, the filling material. These packagings could, however, be fully recycled, that is, both packaging and content material recovered, if a possibility were found to separate these materials in an economically viable manner.

It is well known in the meat processing industry to employ devices, with the aid of which the separation of flowable components, i.e. muscle tissue and fat, from non-flowable components, like tendons, skin, cartilage and bones is enabled.

An apparatus of this type which demonstrates the construction principle of these machines is given in DE-A-20 32 774. The operation of this apparatus is such that the material is fed between the pressing belt and the perforated surface of the hollow drum and is there subjected to a quasi hydraulic pressure. The effect of this pressure is that the more readily flowable components flow away through the perforations of the hollow drum, while the remaining components remain on the surface of the hollow drum.

Separators of this kind are also being used in other branches of the food industry such as in vegetable and fruit processing, where these machines can be employed e.g. for mashing potatoes, or in the case of fruit, for separating the fruit flesh from peel, pips and stalks. Attempts have also been made to process food packaging of which the contents have gone bad or have passed the sell-by date in order to separate and reuse the various components.

This, however, has brought to light a number of problems which cause unsatisfactory results. One difficulty is that the pull-in ability of the separator is insufficient, particularly for unwieldy or bulky packaging, so that suitable additional auxiliary units such as stuffing devices or the like must be employed to overcome this problem. An apparatus which attempts to solve this problem for the processing of fish is described in Japanese utility model No. 26-7881. In this arrangement a cutting device consisting of two counter-rotating cylinders having overlapping rows of curved-bladed knives is arranged upstream of a conventional belt and band separator. The cutting device is intended to slice the fish into smaller pieces so that the separator receives a constant flow of material to process. This apparatus is effective for fish which have a very soft consistency and are consequently easily sliced into pieces, however it is wholly unsuitable for cutting up comparatively rigid containers. These would merely be spiked or punctured by the knives and remain caught on the cylinders. A more serious shortcoming, however, is the insufficient degree of separation achievable, which is due particularly to cavities being formed as the packaging is flattened under pressure. Two prior art machines concerned with reducing packaging containers to a small size for subsequent processing are described in U.S. Pat. No. 5,100,064 and U.S. Pat. No. 5,230,917. In U.S. Pat. No. 5,100,064, a mincing and extruding apparatus is arranged upstream of a conventional belt and band soft separator. The mincing and extruding apparatus masticates the mixture of packaging and contents with rotating blades, forms it into an elongate mass and cuts it into small pieces with a rotary knife. The resulting mass is then fed to the separator. The mincing process will reduce the packaging to a size and form that can contain no pockets or cavities which trap content material but the packaging is also overprocessed to such an extent that tiny particles of packaging material are created. These particles will inevitably be forced through the perforations of the separator drum as the mass is compressed and land in the recovered content material, severely impairing its quality and rendering it unfit for human consumption. Furthermore, the high mechanical and frictional forces applied to the packaging and its contents will alter the make-up of some of the more delicate foodstuffs, such as dairy products or products containing eggs resulting in impaired taste and quality.

In U.S. Pat. No. 5,230,917 metal cans are lacerated by a cutting apparatus prior to being washed on a vibrating grating to remove the contents. The cutting apparatus comprises two counter-rotating shafts having discs with tangentially directed and radially extending knife edges disposed around their outer edges. This cutting apparatus is adapted to lacerate the cans into segments or strips without crushing the cans. It is essential that the cans are not crushed because the subsequent washing step can be performed effectively only on loosely lacerated pieces. In order to avoid this the knife blades will not force the cans between the cylinders but will rather cut them progressively into smaller and smaller pieces until they can fall between the shafts onto the vibrating grating. Many of the resulting pieces are therefore of a size which is entirely unsuitable for processing with a soft material separator because they will be forced through the perforated drum with the content material. Content material remains accumulated in these cavities so that, on the one hand, the retrieved packaging material can only be reused after cleaning which, depending on the application, involves high water consumption and disposal costs and, on the other, the process is associated with a relatively large loss of yield of the content material.

OBJECTS OF THE INVENTION

It is thus an object of the present invention to provide a method and apparatus which overcome the above inadequacies of the prior art devices.

Specifically, it is an object of the present invention to provide a process and an apparatus for separating packaging material from the material contained therein in a highly economic fashion while ensuring that the recovered materials are of a quality which enables them to be reused, or to form the base product for a further process.

SUMMARY OF THE INVENTION

These objects are achieved in a method for recovering packaging and its contents by subjecting the mixture to a first step, wherein the packaging elements are cut up into rough particles and subsequently separating the contents from the packaging material by continuous pressing.

This method is carried out by an apparatus comprising a shredder for shredding the packaging elements complete with contents and a soft material separator at least functionally arranged directly downstream of the shredder.

The advantages achievable with the invention specifically include the recovery of both material components, i.e. packaging and content material, directly and extensively separated from one another, so that their subsequent processing is generally possible without further preparation.

A further refinement of the packaging material recovered in this way can, according to the material type and specifically in the case of synthetic or plastic materials, be obtained by standardizing the particle size by means of a grinding device connected directly downstream of the soft material separator.

An advantage of this grinding or granulating step can be seen particularly in the case of plastic pots or tubs for dairy products such as cream, quark, yoghurt and the like, which are normally sealed with aluminium foil. The separator produces a packaging material component, which is a mixture of both materials. By means of the described grinding or granulating, however, the requirements for separating the materials by known processes, for example by using static electricity are fulfilled.

The grinding device can advantageously consist of a blower mill of known construction, with which the suction current also ideally ensures that the separated coarse particles of packaging material are rapidly and continuously conveyed and the air current removes moisture adhering to the particles to the greatest possible extent. The latter effect can be expressly optimised by extending the suction path and adapting its form to generate turbulence during the conveyance.

BRIEF DESCRIPTION OF THE DRAWINGS

Further objects and advantages of the present invention will be apparent from the following description and claims and are illustrated in the accompanying drawings, which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings:

FIG. 4 shows an enlarged detail view of the shredding apparatus of FIG. 1 in section, FIG. 5 shows a partial plan view of the cylinders of the shredding apparatus according to FIG. 4, and FIGS. 6 and 7 show partial views of further embodiments of the shredding apparatus of FIG. 1.

Figure 1:
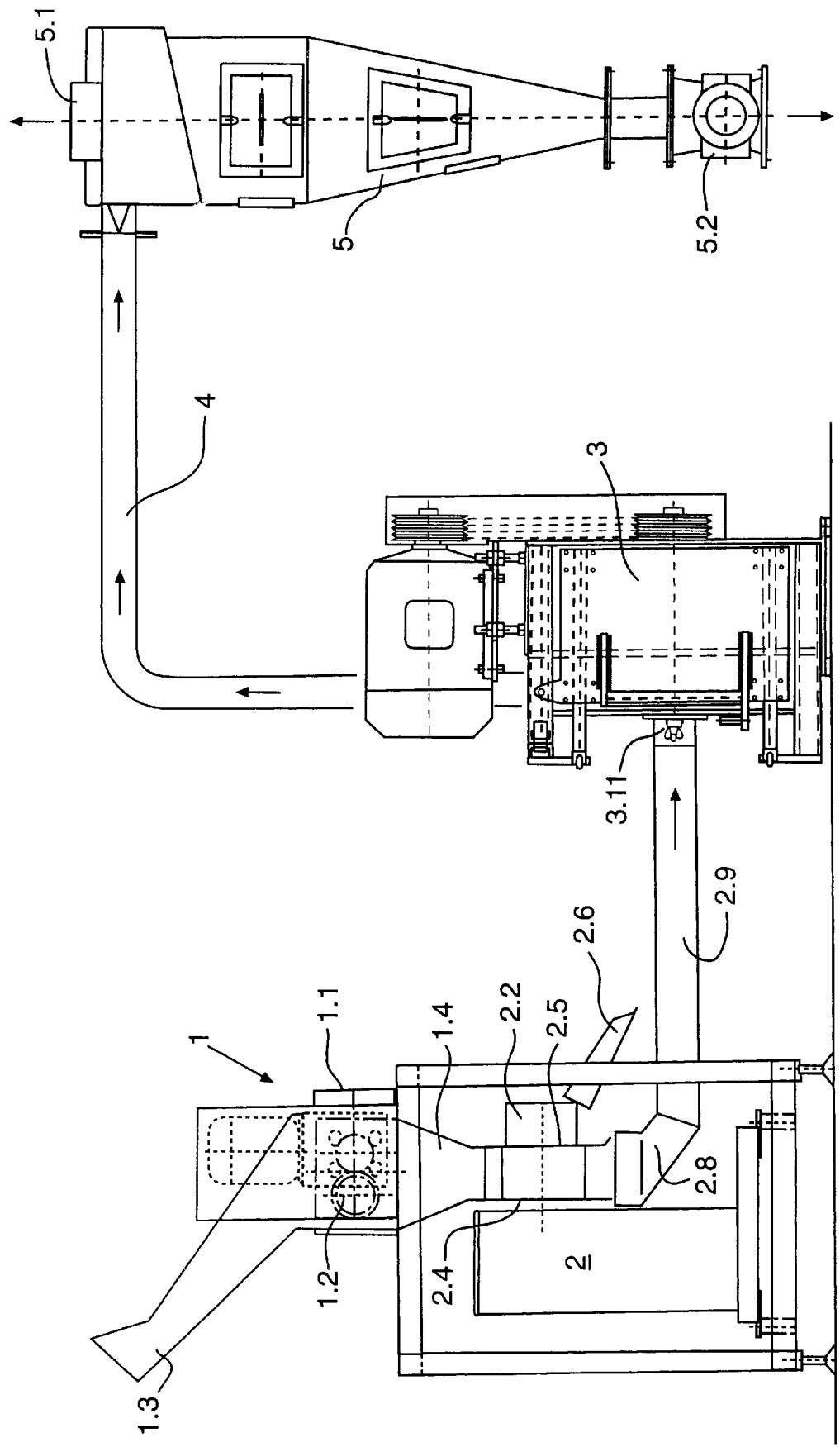
FIG. 1 shows a side view of the whole system.
Figure 2:
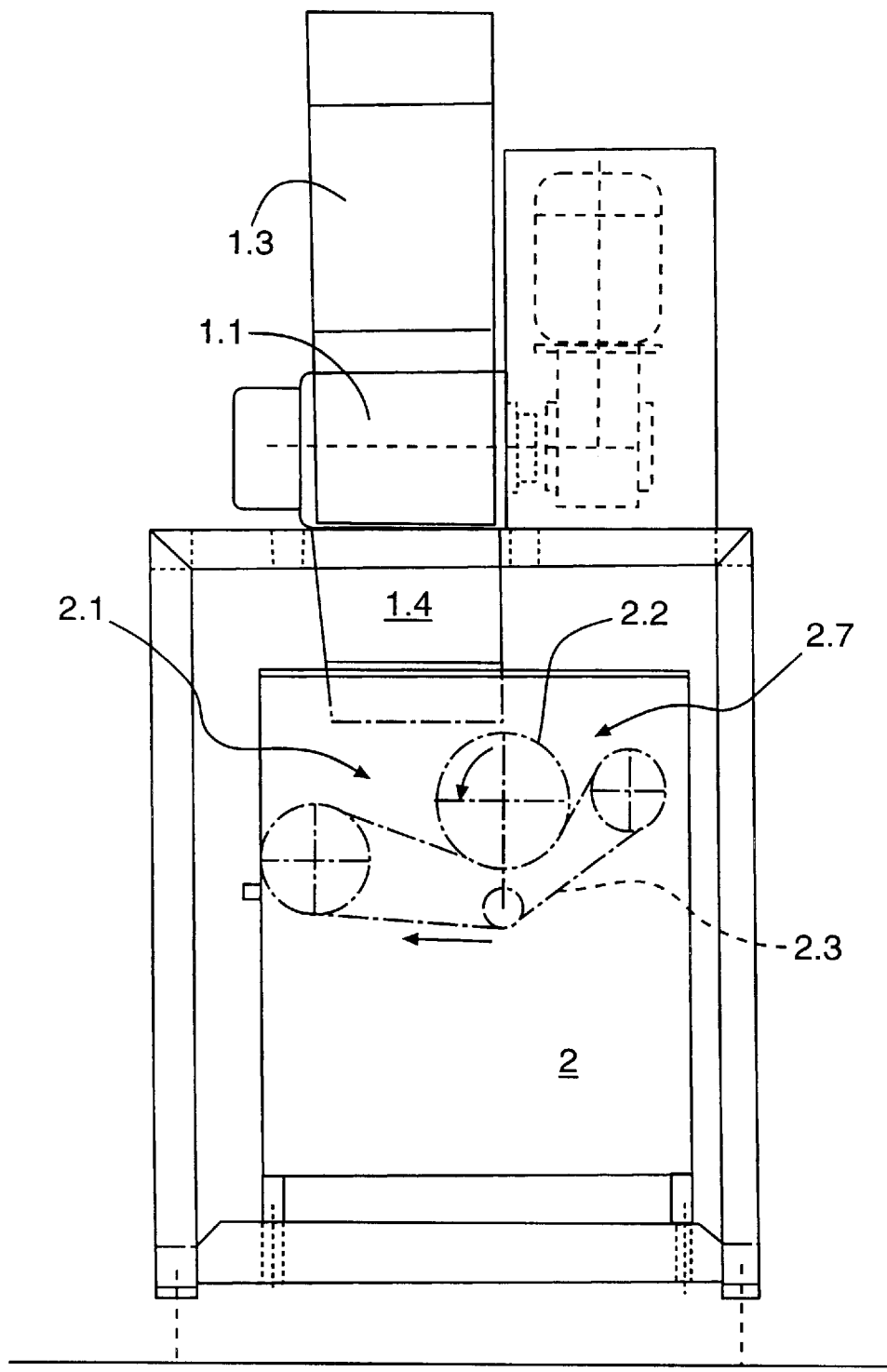
FIG. 2 shows a representation of the combination of a shredder and a separator.
Figure 3:
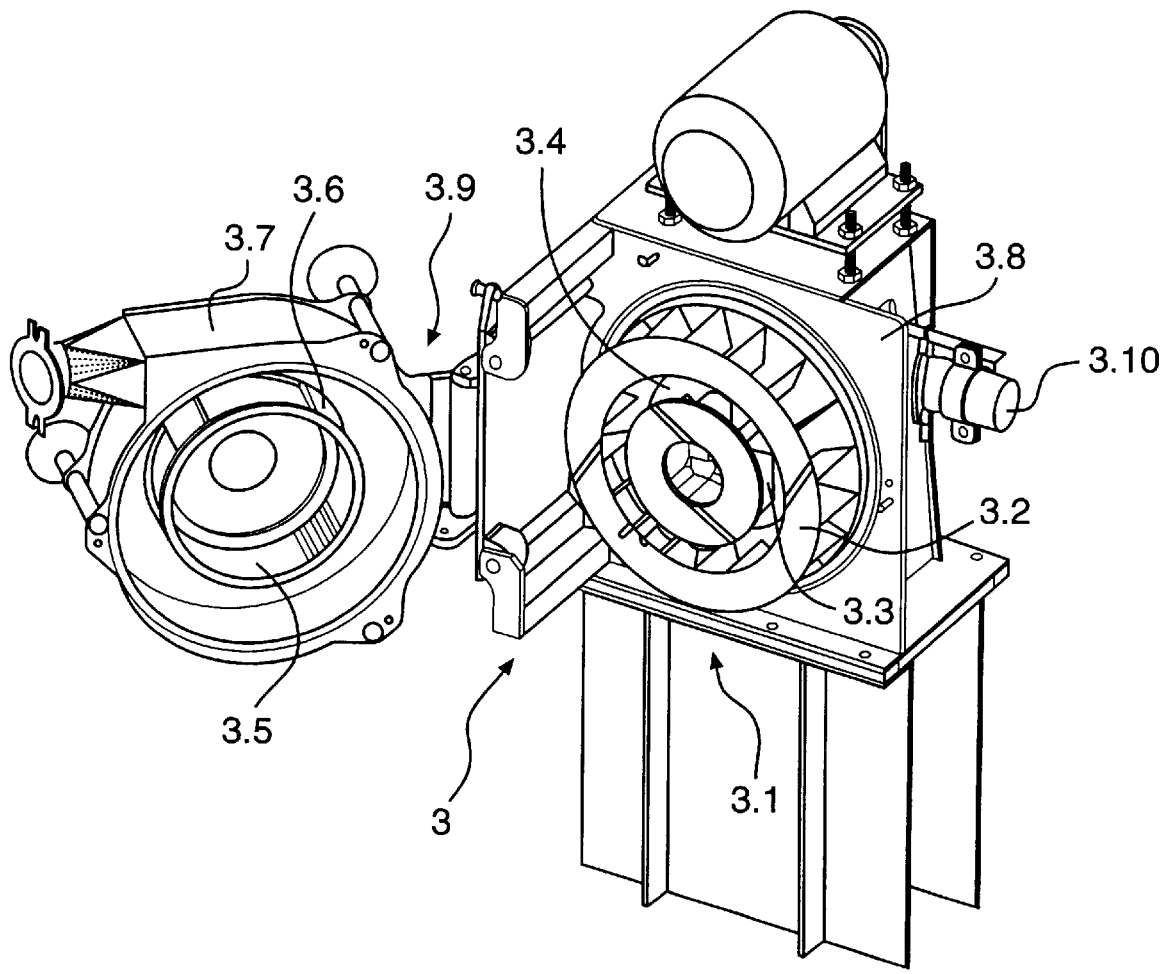
FIG. 3 shows a perspective view of the blower mill in cleaning configuration.

The installation according to the invention consists of a shredder 1, a separator 2 of the type comprising a perforated drum and a pressing belt, a fragmenter or comminuter 3 and a cyclone connected to the fragmenter by means of a conduit 4. The reducing apparatus 1 comprises a feed chute 1.3 and a collecting chute 1.4 at its output and in a preferred embodiment includes a pair of counter-rotating, driven cylinders 1.2 which together form a pull-in zone 1.5 for the packaging material. These cylinders 1.2, as shown in FIG. 4, comprise several mutually spaced radial discs 1.6 of about 10 mm in width. The discs are substantially flat and have a number of tearing claws or teeth 1.7 extending essentially radially from their peripheries for engaging the packaging material. In the embodiment shown in FIGS. 1 and 4, four claws are arranged around each disc.1.6.

As the apparatus allows for the recovery of foodstuff as well as packaging material, it will be operating in an environment where high standards of hygiene are stringently enforced. To facilitate the cleaning of the apparatus therefore, it is preferred that the individual discs 1.6 of the cylinders 1.2 be removable. To this end, the discs 1.6 are provided with an essentially central hexagonal opening for mounting on a hexagonal shaft 1.8 which prevents the free rotation of the discs 1.6 around the shaft. The spacing between the discs is achieved by means of distance or spacer rings 1.9 mounted on the shaft 1.8 between adjacent discs 1.6. The width of the distance rings is selected to be slightly larger than the width of a disc to form a slot or groove 1.10 between adjacent discs 1.6.

In order that the rotation of the cylinders be essentially uniform during operation and that any tendency to oscillate be suppressed, the claws 1.7 of adjacent discs 1.6 on each cylinder 1.2 are preferably circumferentially offset from one another. This has the additional advantage of rendering the drawing-in of the packaging material more evenly which results in a more effective cutting and tearing operation. This can usefully be achieved by mounting adjacent discs 1.6 angularly offset by 30° or 60° around the hexagonal shaft 1.8.

However, the invention is not limited to this embodiment and the shaft and discs may be formed as a single unit by casting, milling or the like. In such an arrangement the shafts are preferably disposed such that they may be swung out of their engaged position to enable thorough cleaning of the grooves 1.10 and claws 1.7.

In operation the shafts 1.8 are disposed parallel to one another and the discs of one cylinder are arranged axially offset from the discs of the other. The distance between the shafts roughly corresponds to the diameter of one disc 1.6 so that the cylinders just overlap and the outer peripheries of the discs 1.6 of one cylinder penetrate into the grooves 1.10 of the other, and vice versa. As the cylinders rotate, the depth of penetration into the opposing grooves varies, the maximum penetration being reached when the claws 1.7 extend into the grooves 1.10. For optimal operation it is preferred that the claws 1.7 do not extend to the base of the opposing groove during rotation but that a spacing of at least 10 mm be maintained between the top of the claws 1.7 and the base of the groove at the maximum penetration depth. This prevents excessive crushing of the packaging materials which could affect the quality of the recovered content material.

To prevent particles of packaging materials from becoming lodged in the grooves, the shredder 1 is provided with a scraping mechanism 1.2 which usefully takes the form of a row of fingers extending to the bases of the grooves 1.10 between the discs 1.6 of each cylinder 1.2.

The outer peripheries of the discs 1.6 and the claws 1.7 are substantially square-edged and the tips of the claws 1.7 consist of tangentially directed ridges 1.11 that extend axially between the two flat faces of the discs 1.6. The ridges 1.11 of the claws 1.7 serve to engage and hook the packaging material, pulling the latter into the region of overlap between the cylinders. As the claws 1.7 approach the opposing grooves 1.10, the packaging material is pinched between the right-angled edges of the opposing discs and cut and torn by the scissoring action as the claw 1.7 penetrates fully into the groove 1.10. The packaging material will also be partially crushed as it is drawn into the grooves 1.10 which helps to break-up more rigid containers, and this effect can be enhanced by suitably adjusting the spacing between opposing discs 1.6.

During operation, the cylinders 1.2 may be driven at the same speed which results in a scissoring action occurring only between the claws 1.7 and the edges of the opposing discs 1.6 due to the higher peripheral speed of the claws 1.7. However this scissoring action can be extended over the whole periphery of the discs by driving one cylinder at a higher speed than the other. It has been found that an optimal speed relation exists when the speed of one cylinder exceeds that of the other by approximately 10%.

The resulting combined cutting, tearing and crushing actions of the shredder reduce and puncture the packaging material to such an extent that the resulting particles are effectively free of pockets or cavities that could trap the content material and reduce the degree of separation attainable which the subsequent soft material separator. A further advantage of this apparatus is that the packaging material is torn or cut only by the edges of the opposing discs as it is forced through the shredder so that the reduced pieces remain relatively large and coarse. This is essential for the subsequent separator step because the pressure used in this process will inevitably cause tiny particles or chips of packaging, if present, to land in the recovered content material and impair its quality. Furthermore, the single-step nature and speed of this processing step are such that the frictional forces experienced by the content material are minimal. Thus even dairy products such as yogurt, cream or the like which are particularly sensitive to heat and excessive handling can be recovered without impairment of constitution or taste.

Figure 6:
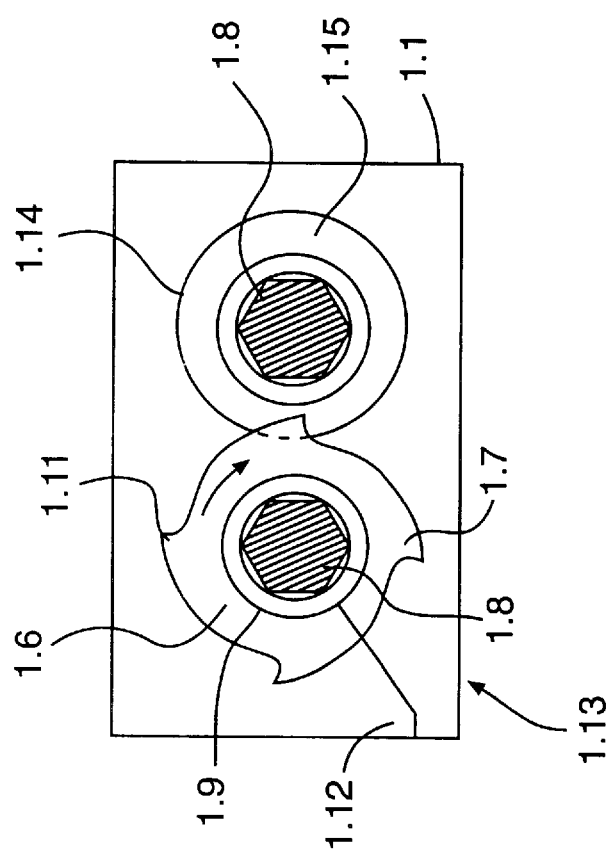

In a further embodiment according to the invention illustrated in FIG. 6, the shredder 1 comprises two cylinders, only one 1.13 of which comprises claws 1.6 on the peripheral surfaces of its discs 1.6 in accordance with the cylinders 1.2 shown in FIG. 4. The other cylinder 1.14 is formed of essentially smooth circular discs separated by square-edged radial grooves 1.15 of a slightly larger width than the discs of the cylinder 1.13. During rotation, the claws 1.6 of the cylinder 1.13 penetrate into these grooves 1.15. The smooth surfaced cylinder 1.14 may be driven in an opposing sense to the cylinder 1.13 or be stationary. In operation, the claws of the cylinder 1.6 engage packaging material and force it between the slots or grooves 1.15 of the opposing cylinder causing it to be cut and torn apart between the edges of the opposing claws 1.7 and discs.

Figure 7:
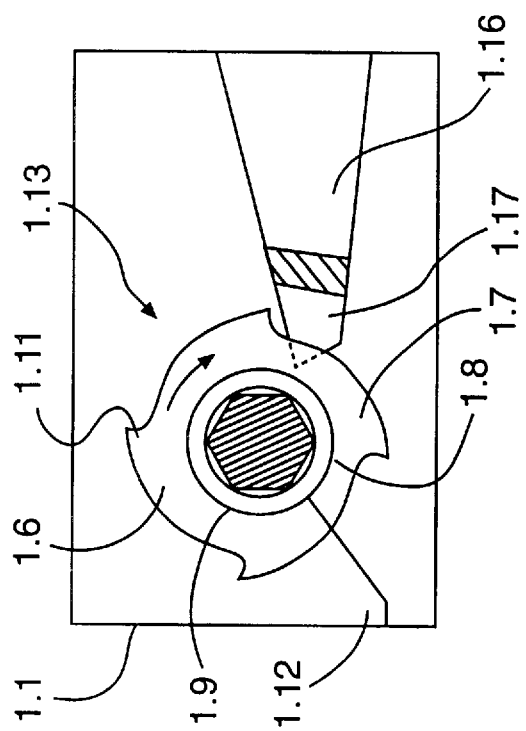

As shown in FIG. 7 in another embodiment of the shredder 1 according to this invention, the second cylinder is replaced by a stationary grid 1.16 or comb which comprises a series of slots limited by right-angled edges 1.17. The slots are dimensioned to permit penetration of the claws 1.7 of the cylinder 1.13 with sufficient spacing to cause packaging material caught by the claws to be cut and torn by the scissoring action of the opposing edges of the discs 1.6 and slots 1.17.

The separator 2 comprises a hollow drum 2.2 driven to rotate in an appropriate and non-shown manner and having a perforated surface. An endless, highly resilient pressing belt 2.3 is pressed against the perforated surface over part of the drum's circumference to pass between side walls 2.4, 2.5, and forms the pull-in zone 2.1 where it converges towards the drum 2.2. The interior of the hollow drum 2.2 is associated with a discharge apparatus 2.6 and the output area 2.7 of the pressing belt 2.3. is associated with a collection funnel 2.8 to which a conduit 2.9 is attached.

The conduit 2.9 connects the output area 2.7 of the pressing belt 2.3 with the subsequent fragmenter or comminuter 3 which is formed a s a blower mill.

The blower mill 3 comprises a drum rotor 3.1, mounted on one side and driven in an appropriate and non-shown manner to rotate. The outer portion of the drum rotor 3.1 is formed as an annular blower wheel 3.3 and the inner portion as a hollow hub with web-like beating elements 3.3, which form a cylindrical body when rotated. The arrangement is such that an annular gap 3.4 is located between the circumferential surface of this cylindrical body and the inner periphery of the blower wheel 3.2 and a stationary sieve basket 3.5 made of a sieve plate extends freely into this gap. Toothed grinding jaws 3.6 are arranged mutually spaced on the inner surface of the sieve basket 3.5 such that the grinding surfaces are located at a small distance from the circumferential surface of the circulating beating elements 3.3.

The sieve basket 3.5 can be brought into its operating position by means of a swing door 3.7, which simultaneously encircles the outside of the blower wheel 3.2 and forms a closed housing with the housing wall 3.8 on which the drum rotor 3.1 bearing is mounted.

The housing 3.9 is provided with an outlet pipe socket 3.10 arranged tangentially to the blower wheel 3.2, and comprises an intake pipe socket 3.11 arranged centrally in the swing door 3.7 (FIG. 1). The conduit 2.9 is connected to the intake socket 3.11 so that the collection funnel 2.8 of the separator 2 is connected to the interior of the drum rotor 3.1.

A cyclone or precipitator 5 of conventional construction is connected to the blower mill 3 by the conduit 4. This precipitator is connected to the outlet socket 3.10 of the blower mill 3 and is provided in its upper portion with an exhaust socket 5.1 and at its lower end with a star feeder lock 5.2 for outputting the end product.

During operation of the device, the packaging elements to be processed are placed in the feed chute 1.3 of the shredder 1 complete with contents and are so fed to the cylinders 1.2 of this device. At this stage, the packaging elements are engaged by the shearing teeth, pulled downwards, and torn and cut into coarse pieces, free of cavities being formed in which content material may be trapped. At this point the content material is released and lands together with the coarse particles of packaging material in the collection chute 1.4 and, consequently, in the pull-in zone 2.1 of the separator 2. Here, the mixture of packaging and content material is pulled in between the hollow drum 2.2 and the pressing belt 2.3 and subjected to a quasi hydraulic pressure. This causes the flowable content material to be expressed through the perforations into the hollow drum 2.2, while the packaging material is conveyed to the output area 2.7. This pressing of the material mixture causes the packaging material to be rendered effectively free from the content material by the time it leaves the pressing zone. While the content material, which has accumulated in the interior of the hollow drum 2.2, is being removed from the process via the discharge apparatus 2.6, the packaging material pieces are collected in the collection funnel 2.8 and from there pulled into the conduit 2.9 and then into the blower mill 3 under the influence and support of a suction current generated by the blower mill 3, which is arranged directly downstream of the separator and operates as a fine fragmenter. The packaging material lands in the centre of the drum rotor 3.1 and is subjected to a centrifugal force, which, in combination with the suction current moving radially in the drum rotor 3.1, forces the packaging material pieces into the gap between the stationary grinding jaws 3.6 and the rotating beating elements 3.3, where the further fragmentation or comminutation takes place. This process continues until the particles are reduced to a size which allows them to pass through the sieve basket 3.5. The blower wheel 3.2 then effects the further conveyance of the stream of ground material into the conduit 4 and hence into the cyclone 5, from which the material may be collected in sacks, for example.

The size of the particles can easily be regulated by employing an appropriately designed sieve basket 3.5.

Both the paths and the forms of the conduits 2.9 and 4 can be adapted to ensure that the air current generated by the blower mill 3 is kept in close and continuous contact with the individual packaging material pieces, so that the packaging material granulate collected in the cyclone 5 is to all intents and purposes dry. This type of operation allows plastic containers which are sealed with aluminium foil, for example, to be processed to a granulate from which essentially all the aluminium particles can be removed by electrostatic sorting or the like.

We claim:

1. An apparatus for recovering packaging material and its contents comprising
    an apparatus for cutting and tearing said packaging material into coarse particles having
        at least one rotary cylinder comprising axially spaced discs, the outer periphery of each disc comprising at least one tooth projecting essentially radially from said periphery and
    a series of slots extending essentially parallel with the plane of said discs and having substantially square edges, said slots being disposed adjacent said cylinder such that upon rotation of said cylinder said tooth penetrates into a respective slot,
    wherein said tooth is adapted to engage and draw said packaging material into a respective slot to cause said material to be cut and torn on said square edges, and
    a soft material separator arranged directly downstream of said cutting and tearing apparatus for extracting said content material under pressure.

2. An apparatus as claimed in claim 1, wherein said tooth is hooked.

3. An apparatus as claimed in claim 1, wherein said cutting and tearing apparatus comprises a second cylinder with axially spaced discs, said discs forming the series of slots.

4. An apparatus as claimed in claim 3, wherein the discs of said cylinder have essentially square edges and the discs of said second cylinder comprise, respectively, at least one tooth which projects essentially radially from said periphery for engaging packaging material, the teeth of said second cylinder being adapted to penetrate between the discs of said at least one cylinder.

5. An apparatus as claimed in claim 4, wherein said cylinders are counter-rotating.

6. An apparatus as claimed in claim 5, wherein said cylinders are driven at different speeds.

7. An apparatus as claimed in claim 5, wherein a grinding apparatus for finely fragmenting said coarse particles is arranged downstream of said soft material separator.

8. An apparatus as claimed in claim 7, wherein said grinding apparatus is a blower mill that is connected to said soft material separator by means of a conduit system adapted to convey and dry said packaging material.

9. An apparatus for separating and recovering packaging material and its contents, comprising:
    two counter-rotating cylinders having a plurality of mutually offset axially spaced plates with claw-shaped radial projections, the peripheral edges of each plate being essentially square-edged and the cylinders being arranged to mutually overlap over at least part of the peripheries of the plates, wherein adjacent plates are spaced to permit packaging material engaged and drawn into a respective opposing groove by a hook-shaped projection to be cut and torn by the square edges of the mutually overlapping plates; and
    a soft material separator arranged directly downstream of said cylinders for extracting the contents from said packaging material under pressure.

10. An apparatus as claimed in claim 9, wherein said cylinders are driven at different speeds.

11. An apparatus as claimed in claim 9, wherein a grinding apparatus for finely fragmenting said coarse particles is arranged downstream of said soft material separator.

12. An apparatus as claimed in claim 11, wherein said grinding apparatus is a blower mill that is connected to said soft material separator by means of a conduit system adapted to convey and dry said packaging material.

13. A method for recovering packaging material and its contents, comprising the steps
    feeding packaging elements comprising at least remains of content material to a cutting zone,
    cutting and tearing said packaging elements into coarse particles which are devoid of cavities that trap content material and
    applying pressure to said coarse particles progressively to expel said content material.

14. A method as claimed in claim 13, wherein said cutting and tearing step includes forcing said packaging elements between scissoring right-angled edges.

15. A method as claimed in claim 13, wherein said packaging material is subsequently dried in an air current and ground.

* * * * *